United States Patent [19]
Sarnoff et al.

[11] Patent Number: 5,389,768
[45] Date of Patent: Feb. 14, 1995

[54] MICROWAVEABLE CHIP MAKER

[75] Inventors: Norton Sarnoff, Northbrook; Carl R. Fletcher, Kildeer; Laura A. Morris, Oak Park; John F. Chmela, Mount Prospect, all of Ill.

[73] Assignee: Ensar Corporation, Wheeling, Ill.

[21] Appl. No.: 147,116

[22] Filed: Nov. 3, 1993

[51] Int. Cl.$^6$ .................................................. H05B 6/80
[52] U.S. Cl. ............................... 219/732; 219/762; 99/DIG. 14; 426/113; 426/243; 206/445; 220/575; D7/501; D7/547
[58] Field of Search ................ 219/732, 725, 733, 734, 219/735, 762, 763; 206/445, 444; 220/575; 426/113, 241, 243, 114, 115; 99/DIG. 14, 426, 441, 413, 415; D7/501, 504, 505, 547, 449, 553, 338, 351, 357

[56] References Cited

U.S. PATENT DOCUMENTS

| | | |
|---|---|---|
| D. 72,702 | 5/1927 | Farber . |
| D. 164,965 | 10/1951 | Sewell . |
| D. 223,586 | 5/1972 | Burden . |
| D. 231,302 | 4/1974 | Lukawski et al. . |
| D. 240,994 | 8/1976 | Miller et al. . |
| D. 260,219 | 8/1981 | Blake et al. . |
| D. 286,360 | 10/1986 | Trivison . |
| D. 298,100 | 10/1988 | Thurlow . |
| D. 334,323 | 3/1993 | Rohrbeck . |
| 2,003,151 | 5/1935 | Lang . |
| 2,747,787 | 5/1956 | Davidson, Jr. ............ 206/445 |
| 3,545,642 | 12/1970 | Swett ........................ 220/575 |
| 4,143,765 | 3/1979 | Moss, III ................... 206/445 |
| 4,558,197 | 12/1985 | Wyatt ........................ 219/732 |
| 4,896,820 | 1/1990 | Harrington . |
| 4,933,528 | 6/1990 | Barr .......................... 219/732 |
| 4,935,592 | 6/1990 | Oppenheimer ............ 219/732 |
| 5,229,564 | 7/1993 | Chiba ........................ 219/732 |

*Primary Examiner*—Philip H. Leung

[57] ABSTRACT

A circular microwaveable chip maker integrally molded of a microwave oven resistant plastic material, having a row of spacers defining slots between each adjacent pair of spacers. Thin food items are held in the slots in a spaced array to facilitate their cooking in a microwave oven. The chip maker has a handle for transporting it into and out of a microwave oven.

13 Claims, 3 Drawing Sheets

MICROWAVEABLE CHIP MAKER

BACKGROUND OF THE INVENTION

Microwave ovens lend themselves to the processing and cooking of foods in new and innovative ways, and to the development of new food items and characteristics thereof.

It was determined to be of advantage to cook thin expansive food items, such as tortillas, bagel slices, potato slices, chips, crackers, etc. in a microwave oven, and to cook such without the addition of fats and oils to such food items. Yet there was no readily available implement for the efficient handling of such items in a microwave oven. It would be of advantage to provide a suitable implement for such purposes.

SUMMARY OF THE INVENTION

In accordance with the present invention, a microwaveable chip maker is provided. It comprises a microwave oven resistant body of a plastic material. The body includes a support rim for supporting the body on a support surface, and a row of spacers extending upwardly above the rim, with each adjacent pair of spacers defining a slot between them for receiving and holding a thin food item in a spaced relationship to each next adjacent food item, and to permit air flow and circulation therebetween. The spacers merge with the rim so that the rim cooperates with the spacers to support and contain the food items. A finger grippable handle is provided for lifting and transporting the chip maker.

Preferably, the chip maker is circular, and the row of spacers is arranged in a curved array, most preferably along a circle generated about the center of the chip maker. The spacers may terminate radially inwardly in a shelf which cooperates with the spacers and the rim to support and contain the food items. The shelf may be spaced above the elevation of the rim. A central liquid tight compartment may desirably be provided, and may be divided by the handle into at least two liquid tight sub-compartments.

The spacers themselves desirably are upstanding, inverted generally U-shaped elements which merge with the rim on one side and in a shelf on the other side, and with the spacers, rim and shelf cooperating to support and contain the food items.

Further objects, features and advantages of the present invention will become apparent from the following description and drawings.

DETAILED DESCRIPTION

Figure 1:
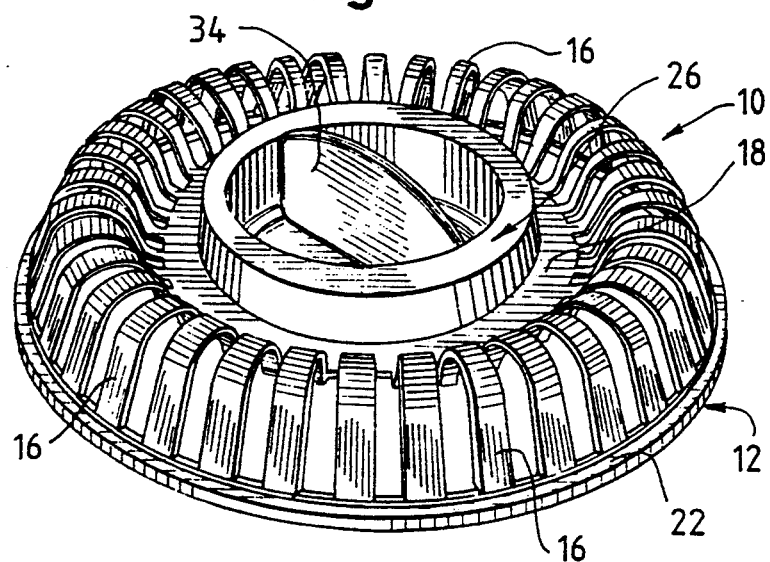
FIG. 1 is a top perspective view of a microwaveable chip maker of the present invention.
Figure 2:
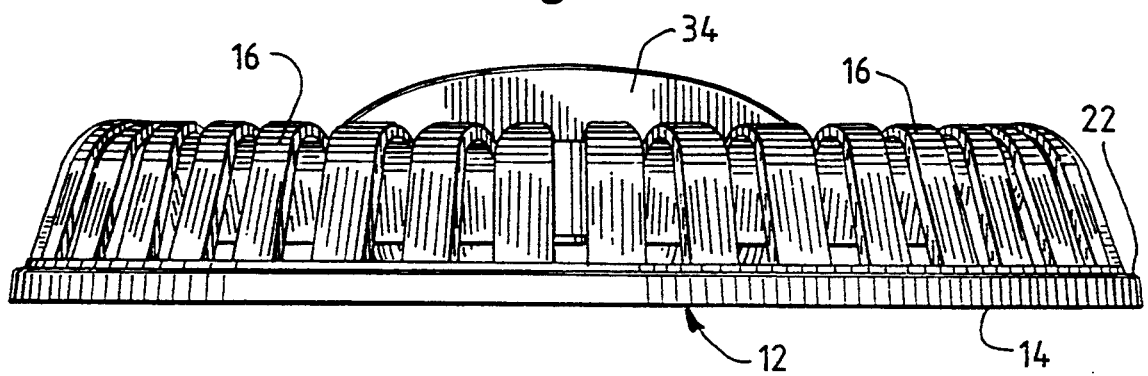
FIG. 2 is a side elevational view of the microwaveable chip maker of FIG. 1.
Figure 3:
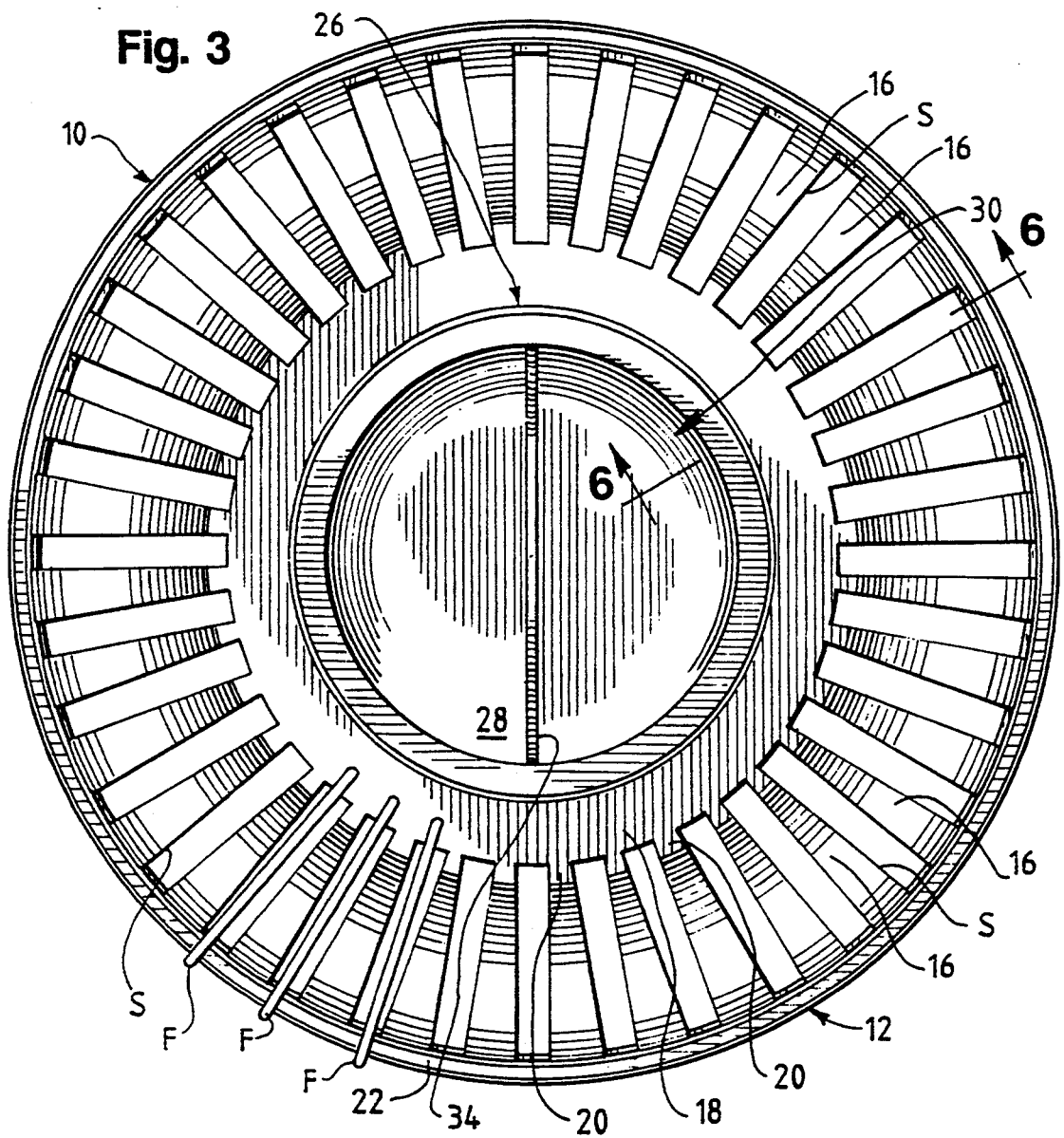
FIG. 3 is a plan view of the microwaveable chip maker of FIG. 1.
Figure 4:
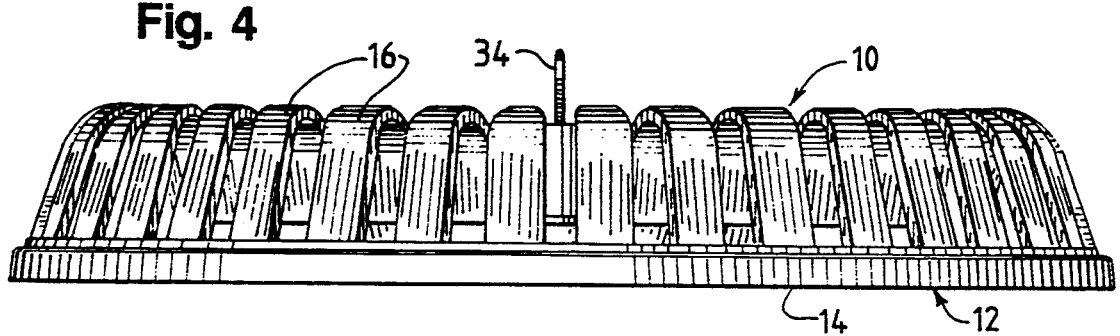
FIG. 4 is a further side elevational view of the microwaveable chip maker of FIG. 1 taken ninety degrees away from the view of FIG. 2.
Figure 5:
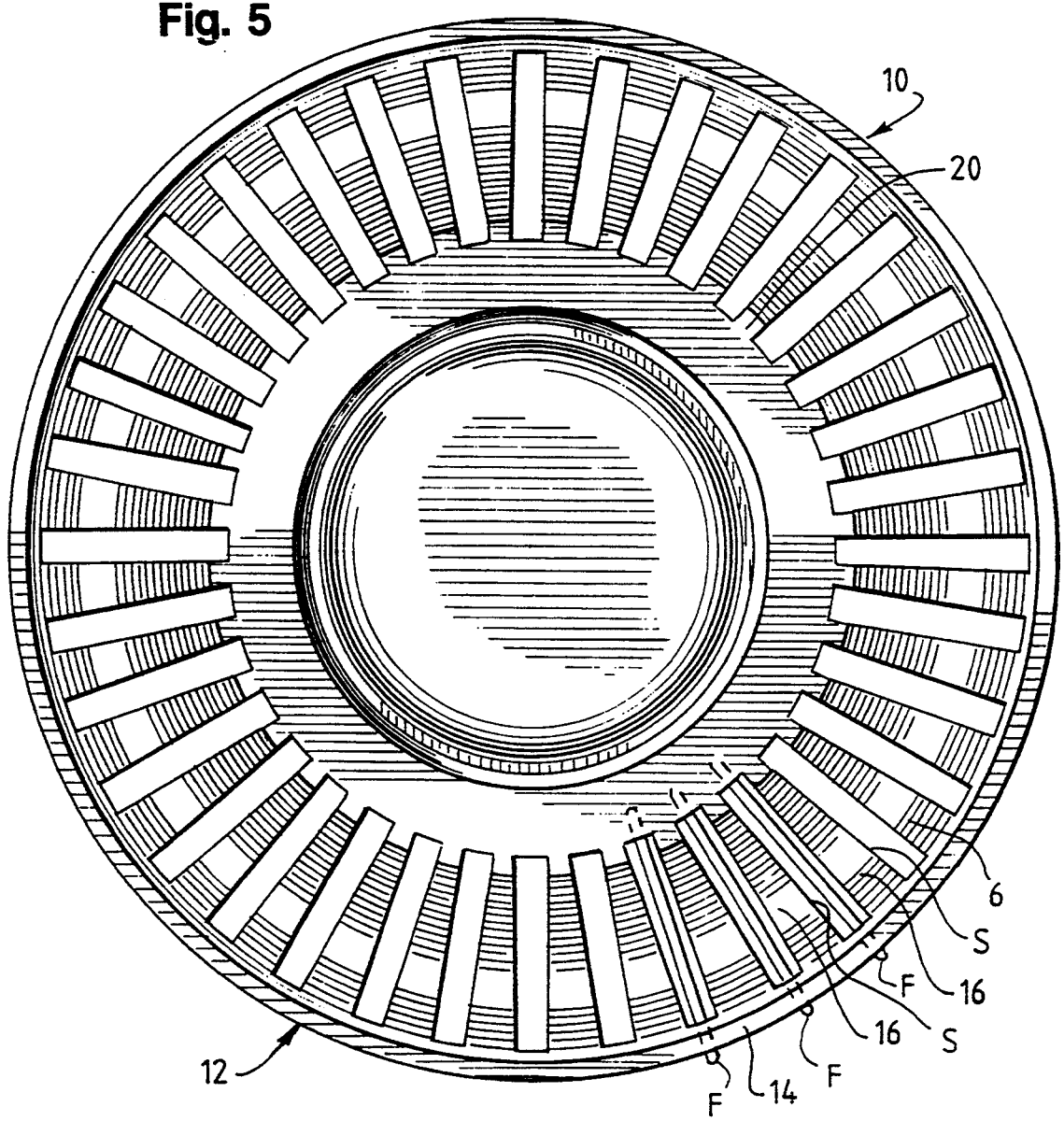
FIG. 5 is a bottom view of the microwaveable chip maker of FIG. 1.

Referring now to the drawings, FIGS. 1–6 show a presently preferred embodiment of a microwaveable chip maker of the present invention. Chip maker 10 is generally circular and is preferable molded integrally of a microwave oven resistant body of plastic material, such as a polypropylene filled with about 40 percent of filler-grade talc.

Chip maker 10 comprises a flat, perimetric support rim 12 which is adapted to support the body on lower rim surface 14 on a flat surface H (FIG. 6) and on a shelf or base of a microwave oven (not shown). A row comprising a plurality of upstanding arched, radial spacer elements or spacers 16, which may be loosely viewed as inverted U-shaped members, merge with and extend upwardly from rim 12. Spacers 16 terminate radially inwardly in, and merge, with a support shelf 18. Spacers 16 are disposed in a curved array, and preferably in a circular array along a circle generated about the center of the chip maker 10. Shelf 18 is desirably spaced above the elevation of the rim 12 and above its lower surface 14. The spacers 16 extend downwardly and merge with radially outwardly extending shelf projections 20, which in turn merge radially inwardly with shelf 18. Each of the adjacent pairs of spacers 16 defines a slot S which open into the spaces between adjacent projections 20.

As will be apparent from the drawings, the upper surface 22 of rim 12, shelf 18 and a pair of spacers 16 cooperate to receive, hold and support thin, generally flat expansive food items such as potato slices, bagel slices, crackers, tortillas and other desired food items in upright position and in a spaced relationship to each other so that they may be cooked effectively, with suitable air flow and circulation, and without contact with the shelf or oven base supporting the microwaveable chip maker 10.

In a preferred form the chip maker 10 may be of a diameter of about 7.75 inches. The outside diameter of shelf 18 is about 4.4 inches and the inside diameter of shelf 18 is about 3.5 inches. The height of chip maker 10 between the lower surface 14 of the rim 12 and the top of the arched spacer elements is about 1.25 inches. The radial extent of the shelf projections 20 is about 0.25 inch, with the handle projecting about 0.5 inch thereabove. The distance between the outside edge of shelf 18 and the inside edge of rim 12 is about 1.4 inches. The support shelf 18 is spaced above surface 14 by about 0.4 inch. The spaces (slot dimensions) between adjacent spacers is about 0.25 inch. There are 36 slots, each spaced 10 degrees away from the next adjacent slot.

Figure 6:
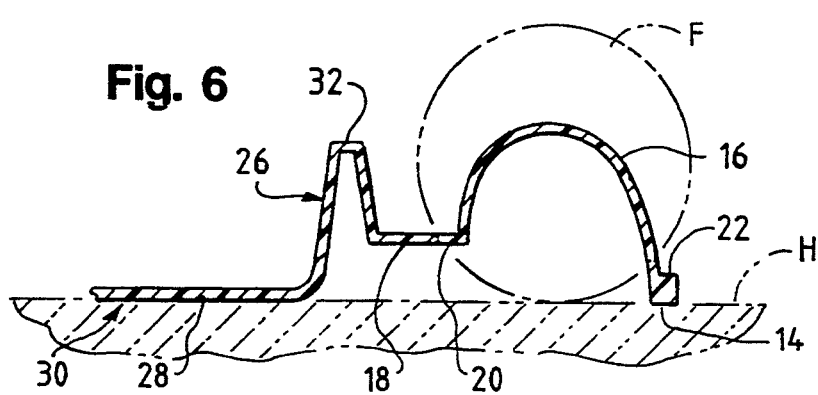
FIG. 6 is a cross-sectional view taken substantially along line 6—6 of FIG. 3.

An upstanding circular wall 26 is provided radially inwardly of the shelf 18. Wall 26 terminates in a base 28 which merges with wall 26 to provide a liquid tight compartment 30. Base 28 extends downwardly approximately to the elevation of rim surface 14 so that it cooperates therewith to provide stability when the chip maker 10 is disposed on a flat supporting surface H. Wall 26 may be solid, or it may be hollow as best shown by FIG. 6. Wall 26 terminates upwardly in a rim 32 which is preferably below the elevation of the apices of spacers 16.

Compartment 30 may be used to contain condiments, and may be divided into at least two sub-compartments by a finger grippable handle 34. Handle 34 extends downwardly to base 28 where it merges with the base, and extends laterally outwardly to where it merges with the wall 26 to form the two liquid tight sub-compartments. Handle 34 also projects upwardly beyond rim 32 and above the other portions of the chip maker 10 to facilitate gripping it by a user's fingers. Thus, handle 34 may be used to transport the chip maker, both for moving it in and out of a microwave oven, and for transporting the chip maker for service use. The handle also serves as a divider to help form the two liquid tight sub-compartments which may be used to contain two different condiments.

The microwaveable chip maker 10 of the present invention has been found to be highly effective and advantageous, and to provide a means for uniformly cooking food items without the use of fats or oils. The spacers 16 which define the slots for the food cooperate with the shelf 18 and rim 14 to define holder compartments for the individual, thin, flat expansive food items. Those spacers are shaped and proportioned so that they support the food items in a generally upright position, and also tend to support the food items, such as generally circular potato slices, so that they will not project below the elevation of the lower surface 14 of rim 12. That helps maintain the cleanliness of the microwave oven and other surfaces upon which chip maker 10 may be supported. The slots S are sized and spaced so that there is sufficient air circulation and flow between them during cooking to permit heated air to contact the surfaces of the food items, and to allow moisture to be carried away from the surfaces of the food items, thereby to allow for effective and uniform cooking.

It will be apparent to those skilled in the art that modifications of, and changes in, the embodiment described and illustrated may be made without departing from the spirit and scope of the present invention. Accordingly, it is intended that the invention should not be deemed to be limited by the specific embodiment described, except as may be necessary in view of the appended claims.

What is claimed is:

1. A microwave oven resistant microwaveable chip maker formed of a plastic material, said chip maker comprising
   a support rim for supporting said chip maker on a support surface,
   a row of spacers formed with said rim and extending upwardly above said rim, each adjacent pair of said spacers defining a slot between them for receiving and holding a thin food item in a spaced relationship to each next adjacent food item, said slot being open at the top and opening below said rim to permit air flow and circulation therebetween and above and below said spacers,
   said spacers merging with said rim so that said rim cooperates with said spacers to support and contain said food items, and
   a finger grippable handle for lifting and transporting said chip maker.

2. A microwave oven resistant microwaveable chip maker in accordance with claim 1, and wherein said support rim is circular, and said row of spacers is arranged along a circle generated about the center of said support rim.

3. A microwave oven resistant microwaveable chip maker formed of a plastic material, said chip maker comprising
   a circular support rim for supporting said chip maker on a support surface,
   a row of spacers formed with said rim and extending upwardly above said rim, each adjacent pair of said spacers defining a slot between them for receiving and holding a thin food item in a spaced relationship to each next adjacent food item, and to permit air flow and circulation therebetween, said row of spacers being arranged along a circle generated about the center of said support rim,
   said spacers merging with said rim so that said rim cooperates with said spacers to support and contain said food items,
   a finger grippable handle for lifting and transporting said chip maker,
   and wherein each of said spacers terminates radially inwardly in a shelf and said shelf cooperates with said spacers and said rim to support and contain said food items.

4. A microwaveable chip maker in accordance with claim 3, and wherein said shelf is spaced above the elevation of said rim.

5. A microwaveable chip maker in accordance with claim 4, and wherein said shelf surrounds a liquid tight compartment, and said handle extends upwardly above said compartment.

6. A microwaveable chip maker in accordance with claim 5, and wherein said handle divides said compartment into at least two liquid tight sub-compartments.

7. A microwaveable chip maker in accordance with claim 3, and wherein said slots are from about 0.2 to about 0.3 inch in width.

8. A microwave oven resistant microwaveable chip maker formed of a plastic material, said chip maker comprising
   a support rim for supporting said chip maker on a support surface,
   a row of spacers formed with said rim and extending upwardly above said rim, each adjacent pair of said spacers defining a slot between them for receiving and holding a thin food item in a spaced relationship to each next adjacent food item, and to permit air flow and circulation therebetween,
   said spacers merging with said rim so that said rim cooperates with said spacers to support and contain said food items,
   a finger grippable handle for lifting and transporting said chip maker,
   and wherein said spacers are upstanding, inverted generally U-shaped elements merging with said rim on one side and in a shelf on the other side, and said spacers, rim and shelf cooperate to support and contain said food items.

9. A microwaveable chip maker in accordance with claim 8, and wherein said shelf is spaced above the elevation of said rim.

10. A microwaveable chip maker in accordance with claim 8, and wherein said spacers are arranged in a curved array.

11. A microwaveable chip maker in accordance with claim 10, and wherein said curved array is a circular array surrounding a liquid tight compartment, with said handle extending upwardly above said compartment.

12. A microwaveable chip maker in accordance with claim 11, and wherein said handle divides said compartment into two liquid tight sub-compartments.

13. A microwaveable chip maker in accordance with claim 11, and wherein said compartment has a base for additionally supporting said body on a support surface.

* * * * *